No. 783,987. PATENTED FEB. 28, 1905.
J. D. WALSH.
ANGLE JOINT.
APPLICATION FILED MAR. 16, 1903.
2 SHEETS—SHEET 1.
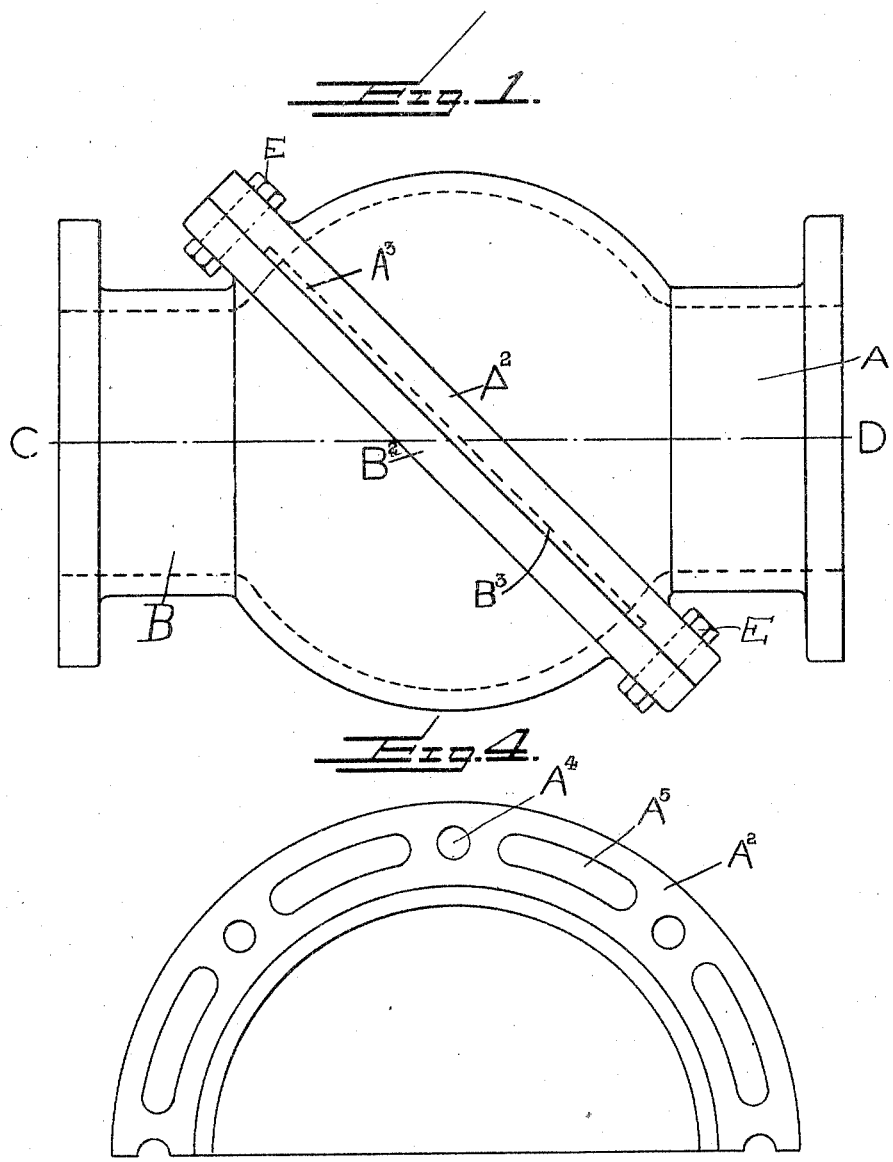
WITNESSES.
Burt W Hall.
Charles R Bishop
INVENTOR:
John D. Walsh
by
his ATTORNEY.

No. 783,987. PATENTED FEB. 28, 1905.
J. D. WALSH.
ANGLE JOINT.
APPLICATION FILED MAR. 16, 1903.
2 SHEETS—SHEET 2.
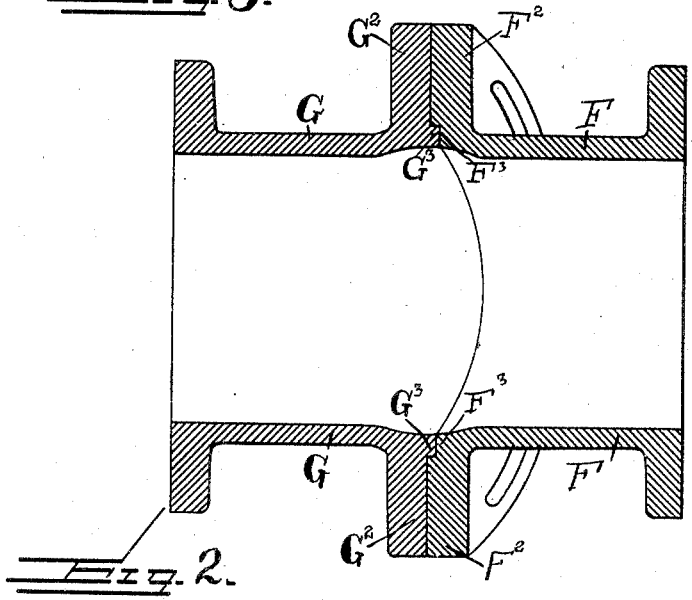
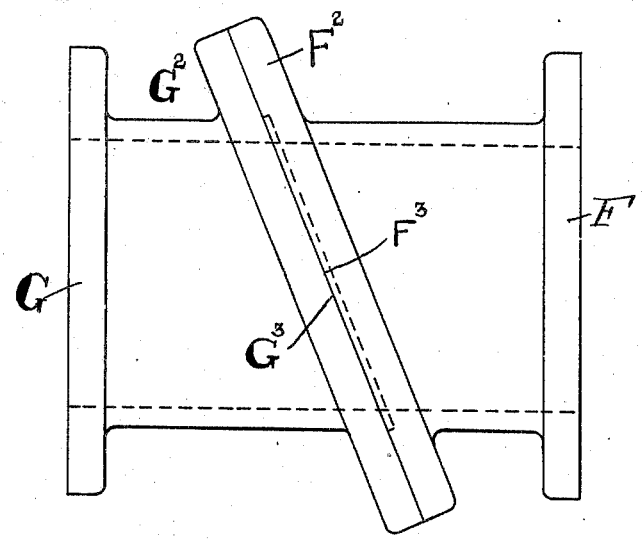
WITNESSES. INVENTOR:
Burt W Hall John D. Walsh
Charles R Bishop by
his ATTORNEY.

No. 783,987.                                   Patented February 28, 1905.

UNITED STATES PATENT OFFICE.

JOHN D. WALSH, OF LOCKPORT, NEW YORK, ASSIGNOR TO AMERICAN DISTRICT STEAM COMPANY, OF LOCKPORT, NEW YORK, A CORPORATION OF NEW YORK.

ANGLE-JOINT.

SPECIFICATION forming part of Letters Patent No. 783,987, dated February 28, 1905.

Application filed March 16, 1903. Serial No. 147,995.

*To all whom it may concern:*

Be it known that I, JOHN D. WALSH, a citizen of the United States, residing at Lockport, in the county of Niagara and State of New York, have invented certain new and useful Improvements in Angle-Joints; and I do hereby declare the following to be a full, clear, and exact description of the invention, such as will enable others skilled in the art to which it appertains to make and use the same.

The object of this invention is to provide an improved form of pipe-joint that will do away with the necessity of having pipe-elbows of various angles.

A further object of the invention is to provide means on the extremities of two pipes whereby through the act of simply rotating one upon the other the angle formed by the axis of the pipes can be varied to any desired angle between certain limits.

With these objects in view and others my invention comprehends the details of construction and arrangement, as hereinafter set forth with reference to the accompanying drawings and then pointed out in the claim.

In the drawings representing a device embodying my invention, Figure 1 is a plan view. Fig. 2 shows one-half of one of the engaging ends of the pipes. Fig. 3 is a longitudinal section through a modification, and Fig. 4 shows the latter in plan view.

In the several views, in which characters of reference indicate corresponding parts, a pipe A has its end cut by a plane oblique to its axis, which end contains a flange $A^2$, that is preferably circular. A pipe B has its extremity cut by a plane that preferably makes the same angle to its axis that is made by the said end flange $A^2$. The pipe B has a flange $B^2$ on its end, which is also preferably arranged circular and of the same dimensions as the flange $A^2$. Consequently when these two ends are brought together with the axes of the pipes A and B coinciding they will appear as shown in Fig. 1. One of the flanges of the pipes—for example, the flange $B^2$ of the pipe B—has a circular rib $B^3$, and the flange $A^2$ of the pipe A has an annular rabbet $A^3$ of a diameter corresponding to the said rib, so that the rib will engage the walls of the rabbet when the two members of the joint are brought together. When it is desired to change the angle of the two pipes, one of the flanges is rotated on the other, which movement will be permitted because the said flange and rabbet are circular and not elliptical, as would be the case if an oblique section were made of a cylindrical pipe. To secure the joint in the various positions, the flanges have circular apertures $A^4$ concentric with their path of revolution and which can be made to register and through which apertures bolts E, having the usual nuts, are passed, securing the joint at the desired angle against any possibility of change of such angle by jar or strain or sudden wrench or the like. Apertures $A^4$ constitute bolt-holes adapted to receive bolts E and practically prevent lateral movement thereof, and whenever in the claim I employ the term "bolt-holes" I desire to be understood as indicating such a construction. The flanges may have also curved slots $A^5$ concentric with the path of revolution, so that bolts E, having the usual nuts, may be passed through the registering portions of these slots. In each flange the apertures and slots alternate and are arranged in substantially a circular series. By this arrangement since the apertures in one flange are adapted to register with the apertures in the other flange and the slots are also adapted to register it is obvious that the two pipe members may be connected for relative rotation by the bolts passing through the apertures in one flange and the slots in the other, and, further, that a bolt standing in an aperture in one flange may be received slidably in any one of the slots of the opposed flange, so that a plurality of such adjustable connections may be effected during one complete relative revolution of the pipe ends. Apertures $A^4$ may be so positioned in the flanges that they will register at the angles most frequently employed in piping or at positions in which the pipes are subject to the greatest strain, for as the apertures fit the bolts closely they will permit tight clamping of the flanges and prevent relative rotation of the pipe members which strain or sudden shock might tend to produce. By passing the bolts through slots $A^5$ in both flanges a high degree of adjustment is permitted by simply loosening the nuts without removing the bolts and rotating the pipes to the required degree, after which the nuts may be tightened again. However, this method has the disadvantage of producing binding of the bolt-heads and nuts on the faces of the flanges through tilting of the bolts as the pipe members are relatively rotated. For this reason when it is desired to permit adjustment of the pipe-joint after laying of the pipes, though not necessary to allow of such extreme movement as permitted by the use of the slots in both flanges, it is found preferable to pass each bolt through an aperture and a slot. In this way the aperture prevents all movement of the bolt except longitudinal movement and obviates binding of the bolts during adjustment of the pipes.

In the form shown in Fig. 1 the engaging faces of the joint make an angle of forty-five degrees with an axis CD, which in this instance is a common axis of both members. In Figs. 3 and 4 a similar joint is shown, in which two pipes F and G have engaging circular flanges $F^2$ and $G^2$. A circular rib $G^3$ engages the walls of the circular rabbet $F^3$. In this instance the angle of each engaging face with the axis of its member is sixty-seven and one-half degrees, or, in other words, is twenty-two and one-half degrees with a plane at right angles to the axis of the pipes. Consequently the maximum angle that can be effected between these two members upon revolving one flange upon the other through an arc of ninety degrees is forty-five degrees. Where the engaging surfaces form an angle of forty-five degrees, as in Fig. 1, the maximum angle that can be produced between the two members is ninety degrees—that is, one would be at right angles with the other.

Without limiting myself to the details of construction hereinbefore set forth, what I claim as new, and desire to secure by Letters Patent, is—

In a pipe-joint, the combination with two relatively rotatable pipe members having the plane of their engaging ends oblique to the axes, and with bolts for securing the members together; of outward-projecting flanges on said engaging ends, containing bolt-holes arranged to substantially coincide to permit the passage of the bolts, and containing also elongated slots interspersed between the bolt-holes and likewise constructed and arranged to substantially coincide to permit the passage of the bolts, the bolt-holes and slots in each flange being arranged in a circular series so that the bolt-holes in one flange may be positioned above the slots in the other flange to permit the passage of the bolts.

In testimony whereof I affix my signature in the presence of two subscribing witnesses.

JOHN D. WALSH.

Witnesses:
BURT W. HALL,
CHARLES R. BISHOP.